(12) United States Patent
Han

(10) Patent No.: US 7,433,071 B2
(45) Date of Patent: Oct. 7, 2008

(54) PRINTING METHOD AND APPARATUS OF MULTI FUNCTION PRODUCT AND COMPUTER-READABLE RECORDING MEDIUM FOR STORING COMPUTER PROGRAM FOR CONTROLLING THE PRODUCT

(75) Inventor: Ho-sung Han, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 921 days.

(21) Appl. No.: 10/755,279

(22) Filed: Jan. 13, 2004

(65) Prior Publication Data
US 2004/0263889 A1 Dec. 30, 2004

(30) Foreign Application Priority Data
Jun. 30, 2003 (KR) .................... 10-2003-0043377

(51) Int. Cl.
*G06F 15/00* (2006.01)
*H04N 1/32* (2006.01)

(52) U.S. Cl. ...................... 358/1.18; 358/468

(58) Field of Classification Search ............... 358/1.15, 358/1.16, 1.6, 468, 1.18; 399/77, 82; 711/206; 712/31
See application file for complete search history.

(56) References Cited

U.S. PATENT DOCUMENTS 4,277,826 A * 7/1981 Collins et al. ............... 711/206
5,887,188 A * 3/1999 Wakatani ..................... 712/31
2004/0036908 A1* 2/2004 Yagita et al. ............... 358/1.15

FOREIGN PATENT DOCUMENTS

JP 2001-312383 11/2001
JP 2003-29940 1/2003

OTHER PUBLICATIONS

Office Action dated May 31, 2005 of Korean Patent Application No. 10-2003-0043377.

* cited by examiner

*Primary Examiner*—Jerome Grant, II
(74) *Attorney, Agent, or Firm*—Staas & Halsey LLP

(57) ABSTRACT

An apparatus for, a method of, and a computer-readable recording medium for controlling printing in a multi function product. If a determination is made that a sub-controller is rendering second printing data when rendering of first printing data is requested and the rendering of the second printing data will take longer than a first predetermined time, a main controller is requested to render the first printing data. If the main controller is idle or will be available within a second predetermined time, the sub-controller provides the first data to the main controller for rendering and the main controller renders the first printing data. If the main controller is not idle and will not be available within the predetermined time, a new determination is made and the process repeats until one of the sub-controller and the main controller renders the first data.

22 Claims, 7 Drawing Sheets

PRINTING METHOD AND APPARATUS OF MULTI FUNCTION PRODUCT AND COMPUTER-READABLE RECORDING MEDIUM FOR STORING COMPUTER PROGRAM FOR CONTROLLING THE PRODUCT

CROSS-REFERENCE TO RELATED APPLICATIONS

This application claims the priority of Korean Patent Application No. 2003-43377, filed on Jun. 30, 2003, in the Korean Intellectual Property Office, the disclosure of which is incorporated herein by reference.

BACKGROUND OF THE INVENTION

1. Field of the Invention

The present invention relates to a multi function product for performing multiple document processing functions, and more particularly, to a method of printing in a multi function product, an apparatus for printing in a multi function product, and a computer-readable recording medium for storing a computer program for controlling the multi function product.

2. Description of the Related Art

Generally, a multi function product performs multi functions such as copy, printing, facsimile, and scan. Since a low priced multi function product controls the execution of the multi functions using a single controller, a plurality of functions cannot be performed simultaneously. However, an expensive multi function product, such as a digital copy machine, includes a plurality of sub-controllers, which control the performance of the multi functions, respectively, and a single main controller, which controls the plurality of sub-controllers, so that the expensive multi function product can simultaneously perform a plurality of functions at a high speed.

A conventional printing apparatus of a conventional multi function product includes a main controller and a sub-controller. The sub-controller includes a renderer which renders printing data, and the main controller includes schedules of results of the rendering performed by the sub-controller and transmits the results of the rendering to a printing engine in sequence. Then, the printing engine prints out the results of the rendering received from the main controller.

Printing jobs of the conventional printing apparatus have a great time difference according to their characteristics. For example, while completion of a simple printing job takes several seconds, completion of a complex printing job such as graphics takes several tens of minutes. Accordingly, when a second printing job is requested while printing data of a first complex printing job is being rendered by the sub-controller, the conventional printing apparatus cannot perform the second printing job and waits until the printing data of the first printing job is completely rendered. Moreover, since the main controller is in an idle state before receiving the result of rendering from the sub-controller, the conventional printing apparatus wastes resources.

SUMMARY OF THE INVENTION

The present invention provides a method of printing in a multi function product, by which printing data is rendered using a main controller which is in an idle state when the printing data is not rendered using a sub-controller.

The present invention also provides a printing apparatus for a multi function product, which renders printing data using a main controller which is in an idle state when the printing data is not rendered using a sub-controller.

The present invention also provides a computer-readable recording medium for storing a computer program for controlling a multi function product which renders printing data using a main controller which is in an idle state when the printing data is not rendered using a sub-controller.

According to an aspect of the present invention, a method of printing in a multi function product comprises controlling execution of a printing function using a sub-controller and controlling execution of multi functions including the printing function using a main controller. The printing method comprises determining whether the sub-controller is rendering second printing data when rendering of first printing data is requested; if a determination is made that the sub-controller is rendering the second printing data when rendering of the first printing data is requested, requesting the main controller to render the first printing data; determining whether the main controller can render the first printing data; and if a determination is made that the main controller can render the first printing data, rendering the first printing data using the main controller.

According to an aspect of the present invention, a printing apparatus for a multi function product comprises a sub-controller which controls execution of a printing function and a main controller which controls execution of multi functions including the printing function and which performs the multi functions. The sub-controller generates and outputs a rendering request signal, asking if the main controller can render first printing data, to the main controller in response to a result of checking whether the sub-controller is rendering second printing data when rendering of the first printing data is requested and transmits the first printing data to the main controller in response to a first control signal received from the main controller; and a main controller which checks whether the main controller can render the first printing data in response to the rendering request signal, transmits a result of checking as the first control signal to the sub-controller, and renders the first printing data received from the sub-controller.

According to an aspect of the present invention, there is provided a computer-readable recording medium for storing at least one computer program for controlling a multi function product comprising a sub-controller controlling execution of a printing function and a main controller controlling execution of multi functions including the printing function and which performs the multi functions. The computer program controls the multi function product according to a process comprising determining whether the sub-controller is rendering second printing data when rendering of first printing data is requested; if a determination is made that the sub-controller is rendering the second printing data when rendering of the first printing data is requested, requesting the main controller to render the first printing data; determining whether the main controller can render the first printing data; and if a determination is made that the main controller can render the first printing data, controlling the main controller to render the first printing data.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
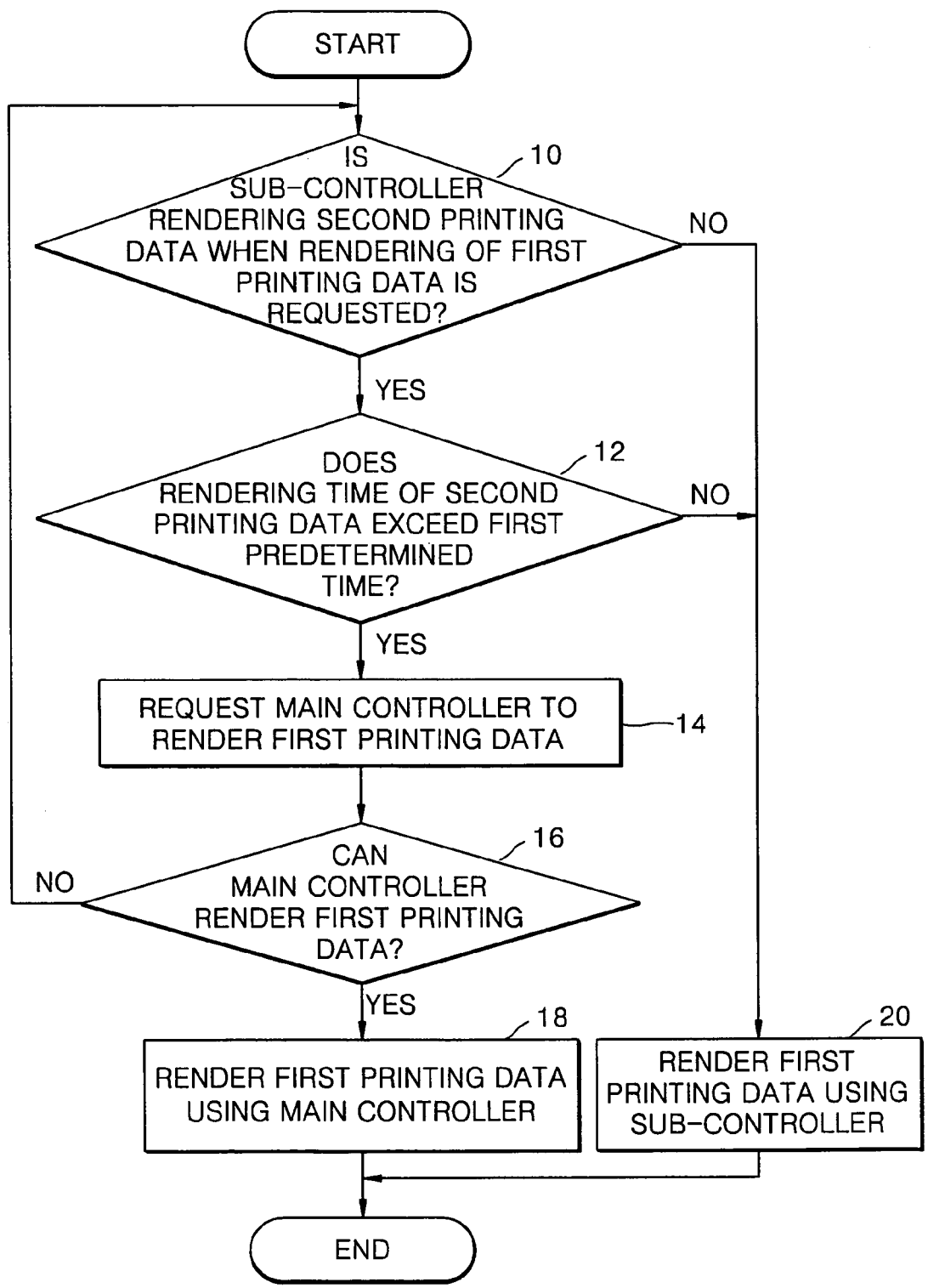
FIG. 1 is a flowchart of a method of printing in a multi function product according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

FIG. 1 is a flowchart of a printing method of a multi function product according to an embodiment of the present invention. The printing method comprises rendering first printing data using a main controller (operations 10 through 18) and rendering the first printing data using a sub-controller (operation 20).

Figure 2:
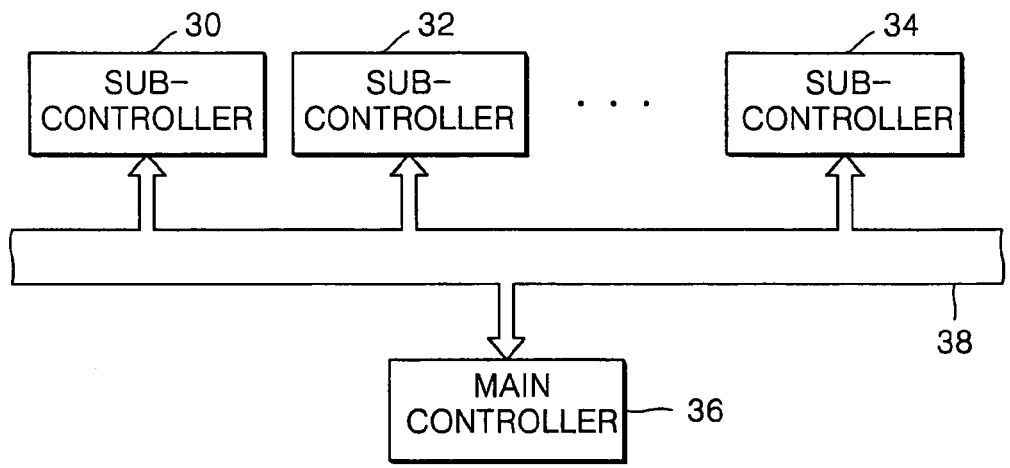
FIG. 2 is a block diagram of a typical multi function product for explaining the printing method shown in FIG. 1.

FIG. 2 is a block diagram of a typical multi function product for explaining the printing method shown in FIG. 1. The multi function product comprises a plurality of sub-controllers 30 through 34, a main controller 36, and a bus 38. The bus 38 may be implemented by a parallel communication interface (PCI) bus which ensures fast data transmission and a satisfactory bandwidth between the sub-controllers 30 through 34 and the main controller 36.

The multi function product shown in FIG. 2 performs multi functions including a printing function and comprises the sub-controllers 30 through 34 and the main controller 36. Each of the sub-controllers 30 through 34 controls an execution of a unique function assigned thereto. For example, the sub-controller 30 may control the execution of a printing function, the sub-controller 32 may control the execution of a scan function, and the sub-controller 34 may control the execution of a facsimile function. The main controller 36 controls the execution of multi functions. The main controller 36 manages, stores, and prints jobs received from the sub-controllers 30 through 34 and controls the individual sub-controllers 30 through 34.

When the sub-controller 30 controls the execution of a printing function, the printing method shown in FIG. 1 is performed by the sub-controller 30 and the main controller 36 shown in FIG. 2.

In the printing method of the present invention, when rendering of first printing data is requested, the sub-controller 30 determines whether the sub-controller is rendering second printing data in operation 10. The second printing data indicates data, a rendering of which has been requested before rendering of the first printing data is requested. The first and second printing data are formed in printer description language (PDL) which may be transmitted from, for example, a host (not shown). Rendering is a process of converting the first or second printing data into a language suitable for printing, which is similar to bitmap data. The language suitable for printing may be a display list or compressed bitmap data.

In operation 10, the sub-controller 30 determines whether the sub-controller 30 is rendering the second printing data different from the first printing data at a time when rendering of the first printing data is externally requested.

When a determination is made that the sub-controller 30 is rendering the second printing data when the rendering of the first printing data is requested, a determination is made whether a rendering time required for the sub-controller 30 to render the second printing data exceeds a first predetermined time in operation 12. When a determination is made that the rendering time exceeds the first predetermined time, the main controller 36 is requested to render the first printing data in operation 14. In other words, when rendering of the first printing data cannot be held in standby for the rendering time exceeding the first predetermined time, the main controller 36 is requested to render the first printing data. According to the present invention, the first predetermined time is settable by a user or a manufacturer of the multi function product.

In another embodiment of the present invention, a printing method of the present invention may not include operation 12 shown in FIG. 1. Where the printing method does not include the operation 12, when a determination is made that the sub-controller 30 is rendering the second printing data when rendering of the first printing data is requested, the sub-controller 30 requests the main controller 36 to render the first printing data in operation 14.

After operation 14, the main controller 36 determines whether the main controller 36 can render the first printing data in operation 16. When a determination is made that the main controller 36 can render the first printing data, the main controller 36 renders the first printing data in operation 18. However, when a determination is made that the main controller 36 cannot render the first printing data, the method progresses to operation 10.

Figure 3:
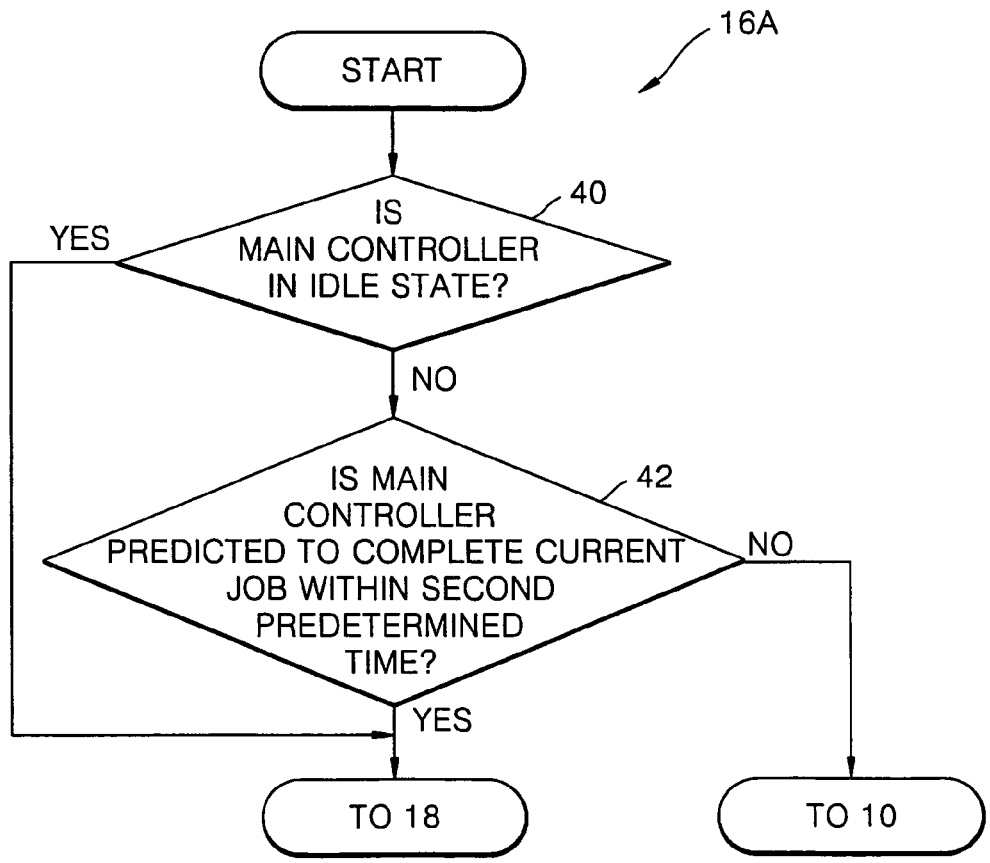
FIG. 3 is a flowchart of an embodiment of operation 16 shown in FIG. 1.

FIG. 3 is a flowchart of an embodiment 16A of the operation 16 shown in FIG. 1. In the embodiment 16A shown in FIG. 3, the method progresses to operation 18 or to operation 10 in operations 40 and 42 according to whether the main controller 36 is in an idle state and according to a predicted time required for the main controller 36 to complete a current job under process.

According to an embodiment of the present invention, operation 16 shown in FIG. 1 may comprise operations 40 and 42 shown in FIG. 3. Where the operation 16 comprises the operations 40 and 42, after operation 14, a determination is made whether the main controller 36 is in an idle state in operation 40. When a determination is made that the main controller 36 is not in the idle state, a determination is made whether the main controller 36 is predicted to complete a current job under process within a second predetermined time in operation 42. When a determination is made that the main controller 36 is predicted to complete the current job under process within the second predetermined time, a determination is made that the main controller 36 can render the first printing data, and the method progresses to operation 18. In other words, although the main controller 36 is not in the idle state at present, the main controller 36 will be in the idle state after the second predetermined time lapses. Accordingly, the method progresses to operation 18 to render the first printing data using the main controller 36 when the second predetermined time has lapsed. However, when a determination is made that the main controller 36 is predicted not to complete the current job under process within the second predetermined time, the method progresses to operation 10. In other words, since the first printing data cannot be held in standby for rendering until the second predetermined time lapses, the method progresses to operation 10. According to the present invention, the second predetermined time is settable by a user or a manufacturer of the multi function product.

In another embodiment, operation 16 shown in FIG. 1 may include only operation 40 shown in FIG. 3. In this situation, after operation 14, a determination is made whether the main controller 36 is in the idle state in operation 40. When a determination is made that the main controller 36 is not in the idle state, the method progresses to operation 10 rather than to operation 42. However, when a determination is made that the main controller 36 is in the idle state, the method progresses to operation 18.

Figure 4:
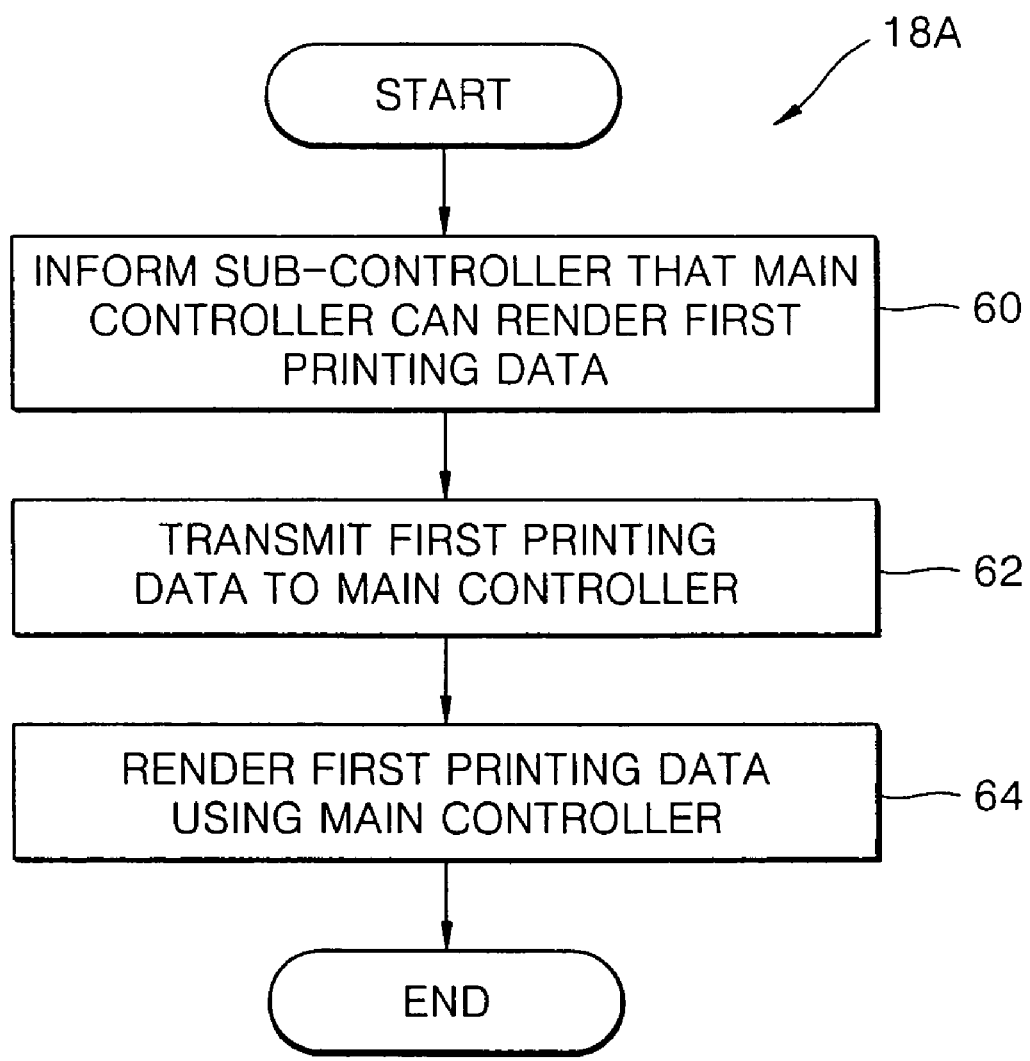
FIG. 4 is a flowchart of an embodiment of operation 18 shown in FIG. 1.

FIG. 4 is a flowchart of an embodiment 18A of operation 18 shown in FIG. 1. In the embodiment 18A of operation 18, the main controller 36 receives the first printing data from the sub-controller 30 and renders the first printing data in operations 60, 62 and 64.

When a determination is made that the main controller 36 can render the first printing data, the main controller 36 informs the sub-controller 30 that the main controller 36 can render the first printing data in operation 60. Next, when the sub-controller 30 is informed that the main controller 36 can render the first printing data, the sub-controller 30 transmits the first printing data to the main controller 36 in operation 62. Next, the main controller 36 renders the first printing data received from the sub-controller 30 in operation 64.

Meanwhile, when a determination is made at operation 10 that the sub-controller 30 is not rendering the second printing data when the rendering of the first printing data is requested, the sub-controller 30 renders the first printing data in operation 20. In addition, when a determination is made that the rendering time required for the sub-controller 30 to render the second printing data does not exceed the first predetermined time, the sub-controller 30 renders the first printing data in operation 20.

The first printing data rendered by the sub-controller 30 or the main controller 36 is stored in a job scheduler (not shown) of the main controller 36, transmitted to a printing engine (not shown) in turn or as determined by the job scheduler, and printed.

Hereinafter, a structure and operation of a printing apparatus of a multi function product according to the present invention will be described.

Figure 5:
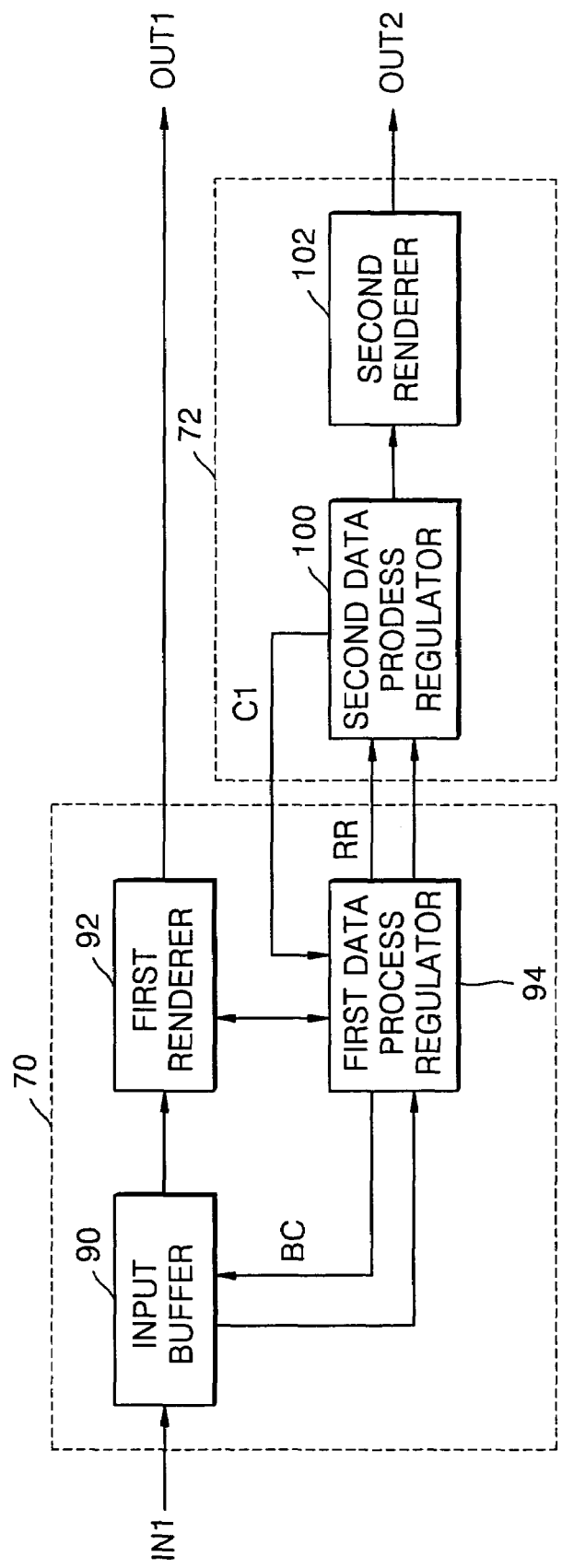
FIG. 5 is a block diagram of a printing apparatus of a multi function product according to an embodiment of the present invention.

FIG. 5 is a block diagram of a printing apparatus of a multi function product according to an embodiment of the present invention. The printing apparatus comprises a sub-controller 70 and a main controller 72.

The printing apparatus shown in FIG. 5 performs the printing method shown in FIG. 1. Accordingly, the sub-controller 70 and the main controller 72 correspond to the sub-controller 30 and the main controller 36, respectively, shown in FIG. 2. In other words, the sub-controller 70 controls execution of a printing function, and the main controller 72 controls execution of multi functions including the printing function.

The sub-controller 70 shown in FIG. 5 performs operations 10, 12, 14, and 20 shown in FIG. 1 and operation 62 shown in FIG. 4. To perform operation 10, the sub-controller 70 checks whether the sub-controller 70 is rendering the second printing data when the rendering of the first printing data is requested. To perform operation 12, the sub-controller 70 checks whether the rendering time of the second printing data exceeds the first predetermined time. To perform operation 14, according to the result of the check, the sub-controller 70 generates a rendering request signal RR asking if the main controller 72 can render the first printing data and transmits the rendering request signal RR to the main controller 72. To perform operation 62, the sub-controller 70 transmits the first printing data to the main controller 72 in response to a first control signal C1 received from the main controller 72. To perform operation 20, the sub-controller 70 renders the first printing data.

To perform the above-described operations, the sub-controller 70 may include an input buffer 90, a first renderer 92, and a first data process regulator 94, as shown in FIG. 5. In performing operation 20, the first renderer 92 renders the first or second printing data received from the input buffer 90 and outputs the result of rendering through an output terminal OUT1.

The input buffer 90 and the first data process regulator 94 perform operations 10, 12, 14 and 62. In other words, the input buffer 90 receives the first or second printing data through an input terminal IN1, buffers it, and outputs the result of buffering to the first renderer 92 or the first data process regulator 94 in response to a buffering control signal BC received from the first data process regulator 94. To perform the operations 10, 12, 14 and 62, the input buffer 90 may be implemented by a network interface card (NIC). When the first printing data is input to the input buffer 90 through the input terminal IN1 and then buffered, the first data process regulator 94 recognizes that the first printing data is requested to be rendered, checks whether the first renderer 92 is rendering the second printing data, and generates the rendering request signal RR and the buffering control signal BC according to the result of the check. The first data process regulator 94 outputs the rendering request signal RR to the main controller 72 and outputs the buffering control signal BC to the input buffer 90. In addition, the first data process regulator 94 transmits the first printing data received from the input buffer 90 to the main controller 72 in response to the first control signal C1 received from the main controller 72. In other words, when the first data process regulator 94 recognizes from the first control signal C1 that the main controller 72 can render the first printing data, the first data process regulator 94 generates and outputs the buffering control signal BC to the input buffer 90 to control the input buffer 90 to transmit the first printing data to the first data process regulator 94. Here, the first data process regulator 94 checks whether the rendering time of the second printing data exceeds the first predetermined time.

Figure 6:
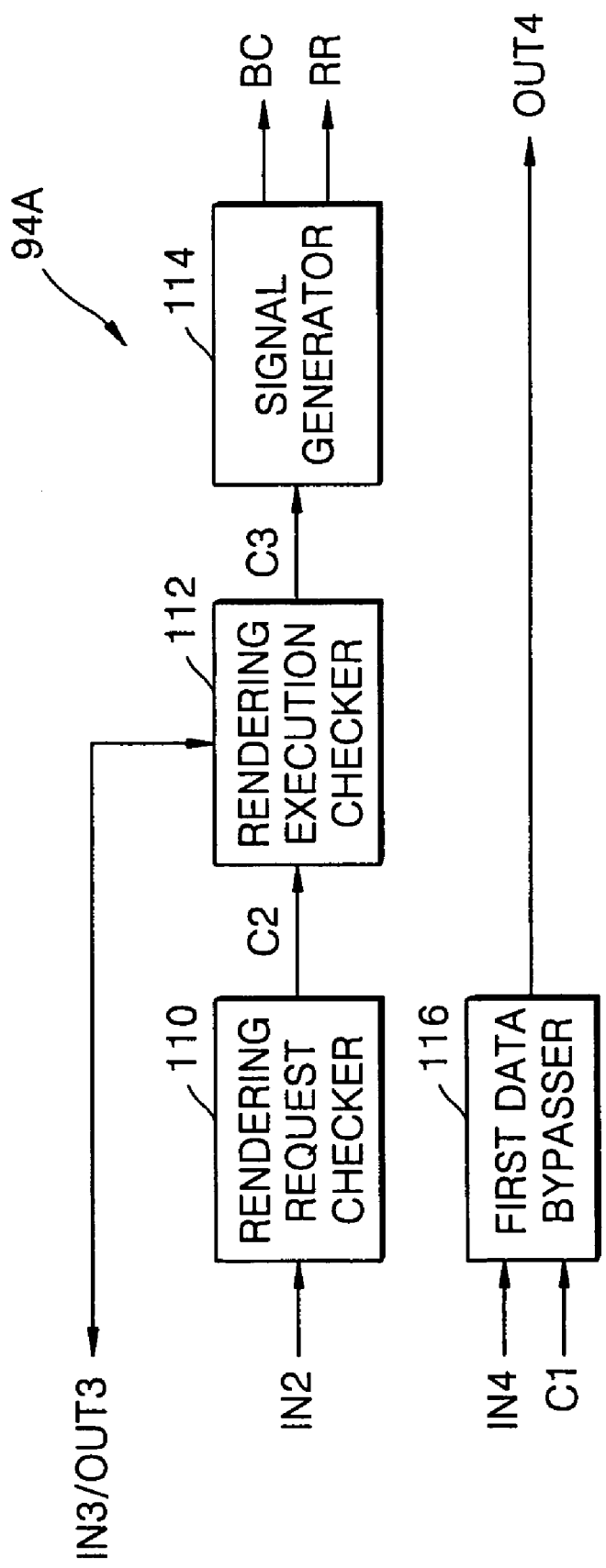
FIG. 6 is a block diagram of a first embodiment of a first data process regulator shown in FIG. 5.

FIG. 6 is a block diagram of a first embodiment 94A of the first data process regulator 94 shown in FIG. 5, according to the present invention. The first embodiment 94A of the first data process regulator 94 comprises a rendering request checker 110, a rendering execution checker 112, a signal generator 114, and a first data bypasser 116.

When the printing method shown in FIG. 1 does not include operation 12, the first data process regulator 94 shown in FIG. 5 may be implemented as shown in FIG. 6. In other words, the first data process regulator 94A shown in FIG. 6 performs operations 10, 14, and 62.

The rendering request checker 110, the rendering execution checker 112, and the signal generator 114 together perform operations 10 and 14. The rendering request checker 110 checks whether the input buffer 90 buffers the first printing data required to be rendered and outputs the result of the check as a second control signal C2 to the rendering execution checker 112. For example, the input buffer 90 checks whether the first printing data is being buffered, and the rendering request checker 110 receives the result of the checking of the input buffer 90 through an input terminal IN2 and determines whether rendering of the first printing data is requested, that is, whether the input buffer 90 is buffering the first printing data. The rendering execution checker 112 checks whether the first renderer 92 is rendering the second printing data in response to a second control signal C2 received from the rendering request checker 110 and outputs the result of checking as a third control signal C3 to the signal generator 114. For example, when the rendering execution checker 112 determines based on the second control signal C2 that the rendering of the first printing data is requested, the rendering execution checker 112 outputs a rendering inquiry signal, asking whether the first renderer 92 is rendering the second printing data, to the first renderer 92 through an output terminal OUT3. Then, in response to the rendering inquiry signal received from the rendering execution checker 112, the first renderer 92 outputs a rendering report signal indicating whether the second printing data is being rendered to the rendering execution checker 112 through an input terminal IN3. The rendering execution checker 112 determines whether the first renderer 92 is rendering the second printing data, based on the rendering report signal received through the input terminal IN3 from the first renderer 92. In response to the third control signal C3 received from the rendering execution checker 112, the signal generator 114 generates and outputs the buffering control signal BC and the rendering request signal RR to the input buffer 90 and the main controller 72, respectively. For example, when the signal generator 114 recognizes from the third control signal C3 that the first renderer 92 is not rendering the second printing data, the signal generator 114 outputs the buffering control signal BC to the input buffer 90 to control the first printing data buffered by the input buffer 90 to be output to the first renderer 92. However, when the signal generator 114 recognizes from the third control signal C3 that the first renderer 92 is rendering the second printing data, the signal generator 114 outputs the buffering control signal BC to the input buffer 90 to control the first printing data buffered by the input buffer 90 to be output to the first data bypasser 116 instead of the first renderer 92. In addition, when recognizing from the third control signal C3 that the first renderer 92 is rendering the second printing data, the signal generator 114 outputs the rendering request signal RR requesting the main controller 72 to render the first printing data to the main controller 72.

To perform operation 62 shown in FIG. 4, the first data bypasser 116 transmits the first printing data received from the input buffer 90 through an input terminal IN4 to the main controller 72 through an output terminal OUT4 in response to the first control signal C1 received from the main controller 72. For example, when the first data bypasser 116 recognizes from the first control signal C1 that the main controller 72 can render the first printing data received from the input buffer 90, the first data bypasser 116 transmits the first printing data to the main controller 72.

Figure 7:
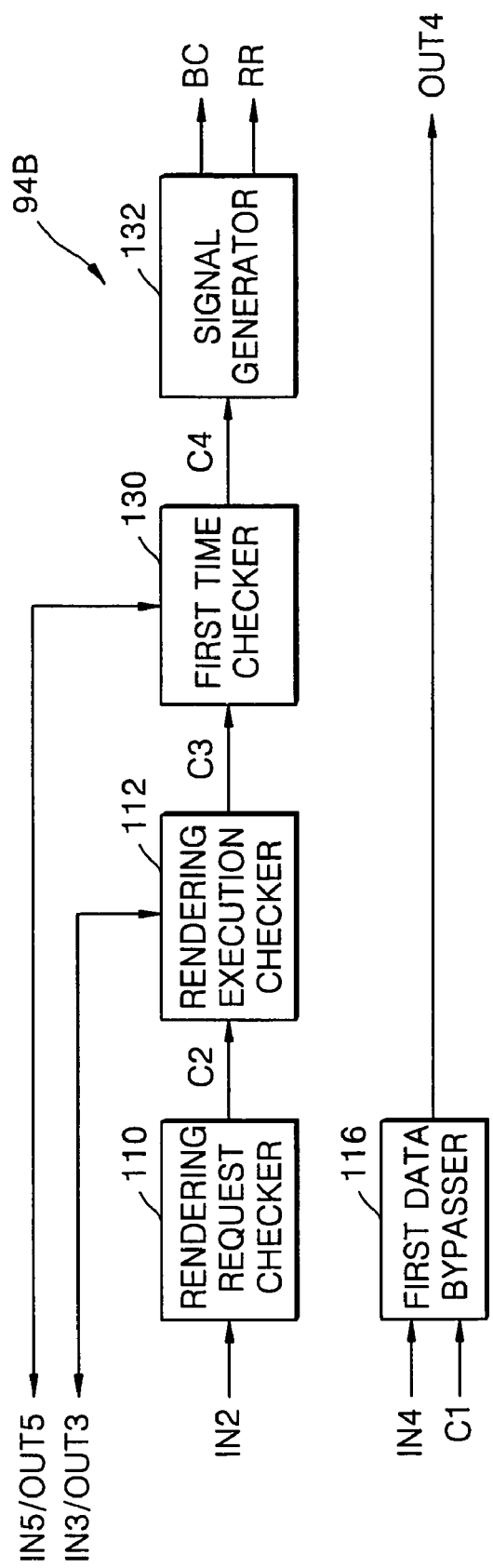
FIG. 7 is a block diagram of a second embodiment of the first data process regulator shown in FIG. 5.

FIG. 7 is a block diagram of a second embodiment 94B of the first data process regulator 94 shown in FIG. 5. The first data process regulator 94B comprises a rendering request checker 110, a rendering execution checker 112, a first time checker 130, a signal generator 132, and a first data bypasser 116.

When the printing method shown in FIG. 1 comprises operation 12, the first data process regulator 94B may be implemented as shown in FIG. 7. The first data process regulator 94B performs operations 10, 12, 14, and 62.

The rendering request checker 110, the rendering execution checker 112, and the first data bypasser 116 shown in FIG. 7 perform the same functions as those shown in FIG. 6, and thus a description thereof will be omitted. The first data process regulator 94B shown in FIG. 7 performs the same operation as the first data process regulator 94A shown in FIG. 6 with the exception that the first data process regulator 94B further performs operation 12. In other words, to perform operation 12, the first data process regulator 94B further comprises the first time checker 130.

To perform operation 12, the first time checker 130 checks whether a rendering time required for the first renderer 92 to render the second printing data exceeds a first predetermined time in response to the third control signal C3 received from the rendering execution checker 112, and outputs the result of the check as a fourth control signal C4 to the signal generator 132. For example, the first time checker 130 outputs a time inquiry signal inquiring about the rendering time required to render the second printing data to the first renderer 92 through an output terminal OUT5. Thereafter, the first time checker 130 receives the rendering time, output by the first renderer 92 in response to the time inquiry signal, through an input terminal IN5, checks whether the rendering time exceeds the first predetermined time, and outputs the result of the checking as the fourth control signal C4 to the signal generator 132.

Then, the signal generator 132 generates the buffering control signal BC and the rendering request signal RR in response to the fourth control signal C4. For example, when the signal generator 132 recognizes from the fourth control signal C4 that the rendering time does not exceed the first predetermined time, the signal generator 132 outputs the buffering control signal BC to the input buffer 90 to control the first printing data buffered by the input buffer 90 to be output to the first renderer 92. However, when the signal generator 132 recognizes from the fourth control signal C4 that the rendering time exceeds the first predetermined time, the signal generator 132 generates the buffering control signal BC to control the first printing data buffered by the input buffer 90 to be output to the first data bypasser 116 instead of the first renderer 92. In addition, when recognizing from the fourth control signal C4 that the rendering time exceeds the first predetermined time, the signal generator 132 outputs the rendering request signal RR to the main controller 72 to request the main controller 72 to render the first printing data.

Meanwhile, the main controller 72 shown in FIG. 5 performs operations 16, 60, and 64. In other words, the main controller 72 checks whether the main controller 72 can render the first printing data in response to the rendering request signal RR received from the sub-controller 70 to perform operation 16, transmits the result of the check as the first control signal C1 to the sub-controller 70 to perform operation 60, and renders the first printing data received from the sub-controller 70 and outputs the result of the rendering through an output terminal OUT2 to perform operation 64.

The main controller 72 may comprise a second data process regulator 100 and a second renderer 102, as shown in FIG. 5. To perform operation 64, the second data process regulator 100 outputs the first printing data received from the sub-controller 70 to the second renderer 102. The second renderer 102 renders the first printing data received from the second data process regulator 100 and outputs the result of rendering through the output terminal OUT2. To perform operation 16, the second data process regulator 100 checks whether the main controller 72 can render the first printing data in response to the rendering request signal RR received from the sub-controller 70. In other words, when rendering of the first printing data is requested via the rendering request signal RR, the second data process regulator 100 checks whether the main controller 72 can render the first printing data. To perform operation 60, the second data process regulator 100 transmits the result of checking whether the first printing data is renderable by the main controller 72 as the first control signal C1 to the sub-controller 70.

Figure 8:
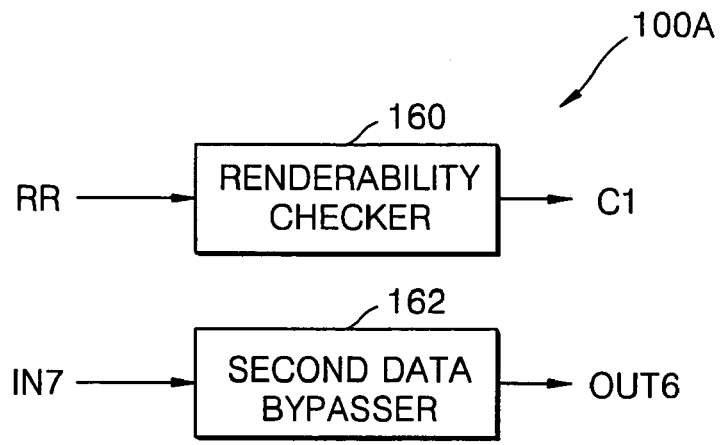
FIG. 8 is a block diagram of an embodiment of a second data process regulator shown in FIG. 5.

FIG. 8 is a block diagram of an alternate embodiment 100A of the second data process regulator 100 shown in FIG. 5. The second data process regulator 100A comprises a renderability checker 160 and a second data bypasser 162.

To perform operations 16 and 60, the renderability checker 160 checks whether the main controller 72 can render the first printing data in response to the rendering request signal RR received from the sub-controller 70 and outputs the result of the check as the first control signal C1 to the sub-controller 70. Then, the sub-controller 70 can recognize from the first control signal C1 whether the main controller 72 can render the first printing data. To perform operation 64, the second data bypasser 162 bypasses the first printing data received from the sub-controller 70 through an input terminal IN7 to the second renderer 102 through an output terminal OUT6.

Meanwhile, the sub-controller 70 shown in FIG. 5 checks whether the first renderer 92 is rendering the second printing data in response to the first control signal C1 received from the main controller 72. For example, when the sub-controller 70 recognizes from the first control signal C1 that the main controller 72 cannot render the first printing data, the sub-controller 70 performs operation 10.

Figure 9:
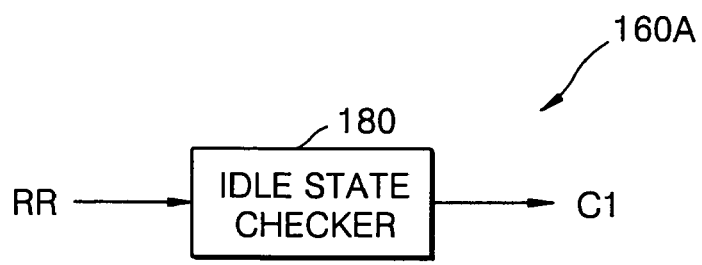
FIG. 9 is a block diagram of a first embodiment of a renderability checker shown in FIG. 8.

FIG. 9 is a block diagram of a first embodiment 160A of the renderability checker 160 shown in FIG. 8. The renderability checker 160A comprises an idle state checker 180.

When operation 16 shown in FIG. 1 comprises only operation 40 shown in FIG. 3, the renderability checker 160A may be implemented by the idle state checker 180, as shown in FIG. 9. To perform operation 40, the idle state checker 180 checks whether the main controller 72 is in an idle state in response to the rendering request signal RR received from the sub-controller 70 and outputs the result of the check as the first control signal C1 to the sub-controller 70.

Figure 10:
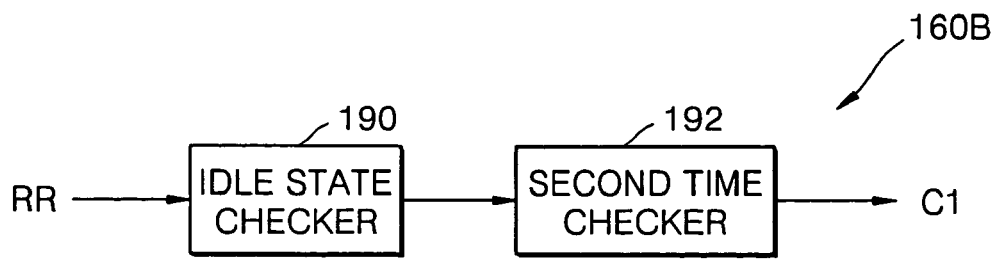
FIG. 10 is a block diagram of a second embodiment of the renderability checker shown in FIG. 8.

FIG. 10 is a block diagram of a second embodiment 160B of the renderability checker 160 shown in FIG. 8. The second embodiment 160B comprises an idle state checker 190 and a second time checker 192.

When operation 16 shown in FIG. 1 comprises operations 40 and 42, as shown in FIG. 3, the renderability checker 160B may comprise the idle state checker 190 and the second time checker 192, as shown in FIG. 10. To perform operation 40, the idle state checker 190 checks whether the main controller 72 is in an idle state in response to the rendering request signal RR received from the sub-controller 70 and outputs the result of the check to the second time checker 192. To perform operation 42, the second time checker 192 checks whether the main controller 72 can complete a current job within a second predetermined time in response to the result of the check received from the idle state checker 190 and outputs the result of checking as the first control signal C1 to the sub-controller 70. For example, when a determination is made from the result of the check received from the idle state checker 190 that the main controller 72 is not in the idle state, the second time checker 192 generates the first control signal C1 corresponding to the result of checking whether the main controller 72 can complete the current job within the second predetermined time. However, when a determination is made from the result of the check received from the idle state checker 190 that the main controller 72 is in the idle state, the second time checker 192 outputs the first control signal C1 to the sub-controller 70 without checking whether the main controller 72 can complete a current job within the second predetermined time to control the sub-controller 70 to transmit the first printing data to the main controller 72.

A computer-readable recording medium for storing a computer program for controlling a printing apparatus of a multi function product according to the present invention will now be described.

The computer-readable recording medium stores at least one computer program for controlling a multi function product performing a printing method of the present invention. The computer program comprises instructions for controlling the multi function product to perform operations of controlling a sub-controller to determine whether the sub-controller is rendering second printing data when first printing data is requested to be rendered; instructions for requesting a main controller to render the first printing data when a determination is made that the sub-controller is rendering the second printing data when the first printing data is requested to be rendered; instructions for controlling the main controller to determine whether the main controller can render the first printing data; and instructions for controlling the main controller to render the first printing data when a determination is made that the main controller can render the first printing data.

A computer-readable recording medium of the present invention may store a computer program comprising instructions for further performing operations of controlling the sub-controller to determine whether a rendering time required to render the second printing data exceeds a first predetermined time if a determination is made that the sub-controller is rendering the second printing data when the first printing data is requested to be rendered, and instructions for requesting the main controller to render the first printing data if a determination is made that the rendering time exceeds the first predetermined time.

The computer program for controlling the main controller to render the first printing data may comprise instructions for controlling the main controller to inform the sub-controller that the main controller can render the first printing data if a determination is made that the main controller can render the first printing data, instructions for controlling the sub-controller to transmit the first printing data to the main controller when the sub-controller is informed that the main controller can render the first printing data, and instructions for controlling the main controller to render the first printing data.

As described above, in a printing method and apparatus of a multi function product and a computer-readable recording medium for storing a computer program for controlling the multi function product according to the present invention, while one printing data is being rendered, another printing data may also be rendered using a main controller in an idle state, so that a load on a sub-controller performing a printing function is reduced. Since the main controller in the idle state is used, resources are more efficiently utilized, thereby accomplishing high speed printing.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of printing in a multi function product having a sub-controller controlling execution of a printing function and a main controller controlling execution of multi functions including the printing function and which performs the multi functions, the printing method comprising:

determining whether the sub-controller is rendering second printing data when rendering of first printing data is requested;

requesting the main controller to render the first printing data, if a determination is made that the sub-controller is rendering the second printing data when rendering of the first printing data is requested;

determining whether the main controller can render the first printing data;

rendering the first printing data using the main controller, if a determination is made that the main controller can render the first printing data;

determining whether a rendering time required for the sub-controller to render the second printing data exceeds a first predetermined time, if the determination is made that the sub-controller is rendering the second printing data when rendering of the first printing data is requested; and requesting the main controller to render the first printing data, if a determination is made that the rendering time exceeds the first predetermined time.

2. The printing method of claim 1, wherein the first predetermined time is set by a user.

3. The printing method of claim 1, wherein the first predetermined time is set by a manufacturer of the multi function product.

4. The printing method of claim 1, wherein the determining of whether the main controller can render the first printing data comprises returning to determining whether the sub-controller is rendering second printing data, if a determination is made that the main controller cannot render the first printing data.

5. The printing method of claim 1, further comprising rendering the first printing data using the sub-controller if a determination is made that the rendering time does not exceed the first predetermined time.

6. A method of printing in a multi function product having a sub-controller controlling execution of a printing function and a main controller controlling execution of multi functions including the printing function and which performs the multi functions, the printing method comprising:

determining whether the sub-controller is rendering second printing data when rendering of first printing data is requested;

requesting the main controller to render the first printing data, if a determination is made that the sub-controller is rendering the second printing data when rendering of the first printing data is requested;

determining whether the main controller can render the first printing data; and rendering the first printing data using the main controller, if a determination is made that the main controller can render the first printing data, wherein the determining of whether the main controller can render the first printing data comprises determining whether the main controller is in an idle state, and the determining of whether the main controller can render the first printing data further comprises determining whether the main controller can complete a current job within a second predetermined time, if a determination is made that the main controller is not in the idle state.

7. The printing method of claim 6, wherein the second predetermined time is set by a user.

8. The printing method of claim 6, wherein the second predetermined time is set by a manufacturer of the multi function product.

9. A method of printing in a multi function product having a sub-controller controlling execution of a printing function and a main controller controlling execution of multi functions including the printing function and which performs the multi functions, the printing method comprising:

determining whether the sub-controller is rendering second printing data when rendering of first printing data is requested;

requesting the main controller to render the first printing data, if a determination is made that the sub-controller is rendering the second printing data when rendering of the first printing data is requested;

determining whether the main controller can render the first printing data; and rendering the first printing data using the main controller, if a determination is made that the main controller can render the first printing data, wherein the rendering of the first printing data using the main controller comprises:

controlling the main controller to inform the sub-controller that the main controller can render the first printing data;

controlling the sub-controller to transmit the first printing data to the main controller when the sub-controller is informed that the main controller can render the first printing data; and controlling the main controller to render the first printing data.

10. A method of printing in a multi function product having a sub-controller controlling execution of a printing function and a main controller controlling execution of multi functions including the printing function and which performs the multi functions, the printing method comprising:

determining whether the sub-controller is rendering second printing data when rendering of first printing data is requested;

requesting the main controller to render the first printing data, if a determination is made that the sub-controller is rendering the second printing data when rendering of the first printing data is requested;

determining whether the main controller can render the first printing data;

rendering the first printing data using the main controller, if a determination is made that the main controller can render the first printing data; and rendering the first printing data using the sub-controller if a determination is made that the sub-controller is not rendering the second printing data when rendering of the first printing data is requested.

11. A printing apparatus for controlling a multi function product, comprising:

a sub-controller which controls execution of a printing function; and a main controller which controls execution of multi functions and the printing function and which performs the multi functions, wherein:

the sub-controller generates and outputs a rendering request signal to the main controller, asking if the main controller can render first printing data, in response to a result of checking whether the sub-controller is rendering second printing data when rendering of the first printing data is requested and transmits the first printing data to the main controller in response to a first control signal received from the main controller; and the main controller checks whether the main controller can render the first printing data in response to the rendering request signal, transmits a result of checking as the first control signal to the sub-controller, and renders the first printing data received from the sub-controller.

12. The printing apparatus of claim 11, wherein the sub-controller comprises:
an input buffer which buffers the first and second printing data and outputs the buffered first and second printing data in response to a buffering control signal;
a first renderer which renders at least one of the buffered first and second printing data; and
a first data process regulator which generates the rendering request signal and the buffering control signal in response to a result of checking whether the first renderer is rendering the second printing data when the first printing data to be rendered is buffered by the input buffer and transmits the first printing data received from the input buffer to the main controller in response to the first control signal.

13. The printing apparatus of claim 12, wherein the first data process regulator comprises:
a rendering request checker which checks whether the first printing data to be rendered is buffered by the input buffer and outputs a result of checking as a second control signal;
a rendering execution checker which checks whether the first renderer is rendering the second printing data in response to the second control signal and outputs a result of checking as a third control signal;
a signal generator which generates and outputs the buffering control signal and the rendering request signal to the input buffer and the main controller, respectively, in response to the third control signal; and
a first data bypasser which transmits the first printing data received from the input buffer to the main controller in response to the first control signal.

14. The printing apparatus of claim 13, wherein:
the first data process regulator further comprises a first time checker which checks whether a rendering time required for the first renderer to render the second printing data exceeds a first predetermined time in response to the third control signal and outputs a result of checking as a fourth control signal, and
the signal generator generates the buffering control signal and the rendering request signal in response to the fourth control signal.

15. The printing apparatus of claim 11, wherein the main controller comprises:
a second renderer which renders the first printing data; and
a second data process regulator which checks whether the second renderer can render the first printing data in response to the rendering request signal, transmits a result of checking as the first control signal to the sub-controller, and transmits the first printing data received from the sub-controller to the second renderer.

16. The printing apparatus of claim 15, wherein the second data process regulator comprises:
a renderability checker which checks whether the second renderer can render the first printing data in response to the rendering request signal received from the sub-controller and outputs a result of checking as the first control signal; and
a second data bypasser which bypasses the first printing data received from the sub-controller to the second renderer.

17. The printing apparatus of claim 16, wherein the sub-controller checks whether the sub-controller has rendered the second printing data in response to the first control signal.

18. The printing apparatus of claim 16, wherein the renderability checker comprises an idle state checker which checks whether the main controller is in an idle state in response to the rendering request signal and outputs the result of checking as the first control signal.

19. The printing apparatus of claim 18, wherein the renderability checker further comprises a second time checker which checks whether the main controller can complete a current job within a second predetermined time in response to the result of checking received from the idle state checker and outputs a result of checking as the first control signal.

20. A computer-readable recording medium for storing at least one computer program for controlling a multi function product which includes a sub-controller controlling execution of a printing function and a main controller controlling execution of multi functions including the printing function and which performs the multi functions, the computer program controlling the multi function product according to a process comprising:
determining whether the sub-controller is rendering second printing data when rendering of first printing data is requested;
requesting the main controller to render the first printing data, if a determination is made that the sub-controller is rendering the second printing data when the rendering of the first printing data is requested;
determining whether the main controller can render the first printing data; and
controlling the main controller to render the first printing data, if a determination is made that the main controller can render the first printing data,
wherein the computer program controls the multi function product according to the process further comprising;
determining whether a rendering time required for the sub-controller to render the second printing data exceeds a first predetermined time, if a determination is made that the sub-controller is rendering the second printing data when rendering of the first printing data is requested, and requesting the main controller to render the printing data, if a determination is made that the rendering time exceeds the first predetermined time.

21. A computer-readable recording medium for storing at least one computer program for controlling a multi function product which includes a sub-controller controlling execution of a printing function and a main controller controlling execution of multi functions including the printing function and which performs the multi functions, the computer program controlling the multi function product according to a process comprising:
determining whether the sub-controller is rendering second printing data when rendering of first printing data is requested;
requesting the main controller to render the first printing data, if a determination is made that the sub-controller is rendering the second printing data when the rendering of the first printing data is requested;
determining whether the main controller can render the first printing data; and
controlling the main controller to render the first printing data, if a determination is made that the main controller can render the first printing data,
wherein the controlling of the main controller to render the printing data comprises:

controlling the main controller to inform the sub-controller that the main controller can render the first printing data if a determination is made that the main controller can render the first printing data;

controlling the sub-controller to transmit the first printing data to the main controller when the sub-controller is informed that the main controller can render the first printing data; and controlling the main controller to render the first printing data.

22. A method of controlling printing of previous and present printing data in a multifunction product having a sub-controller and a main controller, the method comprising:

determining whether the sub-controller is currently rendering the previous printing data;

determining whether the rendering of the previous printing data using the sub-controller will take longer than a first predetermined time, if the sub-controller is currently rendering the previous printing data;

rendering the present printing data using the sub-controller, if the sub-controller is not currently rendering the previous data or if the rendering of the previous printing data will not take longer than the first predetermined time;

requesting the main controller to render the present printing data, if the sub-controller is currently rendering the previous printing data and the rendering of the previous printing data using the sub-controller will take longer than the first predetermined time;

determining whether the main controller is immediately available to render the present printing data, if the main controller is requested to render the present printing data;

predicting whether the main controller will be available to render the present printing data within a second predetermined time, if the main controller is requested to render the present printing data and the main controller is not immediately available to render the present printing data; and rendering the present printing data using the main controller, if the main controller is requested to render the present data and the main controller is either immediately available to render the present printing data or the main controller will be available to render the present printing data within the second predetermined time.

* * * * *

UNITED STATES PATENT AND TRADEMARK OFFICE
CERTIFICATE OF CORRECTION

| | |
|---|---|
| PATENT NO. | : 7,433,071 B2 |
| APPLICATION NO. | : 10/755279 |
| DATED | : October 7, 2008 |
| INVENTOR(S) | : Ho-sung Han |

Page 1 of 1

It is certified that error appears in the above-identified patent and that said Letters Patent is hereby corrected as shown below:

Column 14, Line 36, change "comprising;" to --comprising:--.

Column 15, Line 12, change "multifunction" to --multi function--.

Signed and Sealed this

Twenty-third Day of December, 2008

JON W. DUDAS
*Director of the United States Patent and Trademark Office*